(12) United States Patent
McLaren et al.

(10) Patent No.: US 6,393,584 B1
(45) Date of Patent: May 21, 2002

(54) METHOD AND SYSTEM FOR EFFICIENTLY SAVING THE OPERATING STATE OF A DATA PROCESSING SYSTEM

(75) Inventors: Wayne A. McLaren, Coral Springs; Joseph C. Polimeni, Boynton Beach; Frank J. Schroeder, Boca Raton, all of FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/429,504

(22) Filed: Apr. 26, 1995

(51) Int. Cl.⁷ .................................................. G06F 11/00
(52) U.S. Cl. ............................... 714/14; 714/1; 714/15; 714/24; 713/2; 713/100
(58) Field of Search ................................ 714/1, 10, 14, 714/15, 24; 713/2, 100, 321, 322, 323

(56) References Cited

U.S. PATENT DOCUMENTS

| | | |
|---|---|---|
| 5,241,680 A | 8/1993 | Cole et al. |
| 5,276,890 A | 1/1994 | Arai |
| 5,339,437 A | 8/1994 | Yuen |
| 5,339,444 A | 8/1994 | Nakajima |
| 5,355,490 A | 10/1994 | Kou |
| 5,369,771 A | 11/1994 | Gettel |
| 5,373,300 A | 12/1994 | Jenness et al. |
| 5,386,552 A | 1/1995 | Garney |
| 5,560,023 A * | 9/1996 | Crump et al. ................ 395/750 |

FOREIGN PATENT DOCUMENTS

EP    0 658 843 A1    11/1994

* cited by examiner

Primary Examiner—Majid A. Banankhah
(74) Attorney, Agent, or Firm—Casimer K. Salys; Bracewell & Patterson, L.L.P.

(57) ABSTRACT

A method and system are disclosed for efficiently storing an operating state of a data processing system having a volatile memory within a nonvolatile mass storage device. In response to a selected input, a determination is made whether storing the operating state of the data processing system is possible. If storing the operating state is possible, scheduling of tasks to be performed by the data processing system is halted. Data not required for operation of the data processing system is then removed from the volatile memory. The operating state of the data processing system is stored within the nonvolatile mass storage device, thereby enabling the operating state of the data processing system to be efficiently restored. Thereafter, power is removed from the data processing system. In response to restoring power to the data processing system, a determination is made whether the operating state of the data processing system is stored within the nonvolatile mass storage device. In response to a determination that the operating state of the data processing system is stored within the nonvolatile mass storage device, the operating state of the data processing system is loaded from the nonvolatile mass storage device, thereby restoring the operating state of the data processing system.

4 Claims, 5 Drawing Sheets

METHOD AND SYSTEM FOR EFFICIENTLY SAVING THE OPERATING STATE OF A DATA PROCESSING SYSTEM

BACKGROUND OF THE INVENTION

1. Technical Field

The present invention relates in general to a method and system for improved data processing and in particular to an improved method and system within a data processing system for saving and restoring the operating state of the data processing system. Still more particularly, the present invention relates to an improved method and system within a data processing system for storing the operating state of the data processing system to a nonvolatile mass storage device and thereafter restoring the operating state of the data processing system from the nonvolatile mass storage device.

2. Description of the Related Art

Many data processing systems, and in particular portable data processing systems, are equipped with features which enable a data processing system to maintain its operating state while operating in a low power mode. This so-called "sleep" mode enables a user to retain data associated with the operating system and active applications while essentially suspending all operations of the data processing system. The ability to operate in a low power sleep mode eliminates both the need to power off a data processing system during periods of disuse to conserve battery power and the delay attendant with returning to a particular operating system and application program context once power is restored.

Typically, sleep modes are implemented utilizing a combination of power reduction techniques, such as those specified in the Advanced Power Management (APM) specifications. For example, a data processing system entering sleep mode first saves volatile data associated with the operating system and active applications to a battery-powered memory such as dynamic random access memory (DRAM) or static random access memory (SRAM). The data processing system then reduces its power consumption by slowing the system clock, parking the hard drive, blanking the display screen, and disabling all other unnecessary functions. Thereafter, when the user desires to return the data processing system to normal operation, the user simply inputs a predetermined command, such as a particular keystroke, to the data processing system, which returns the hardware to normal operation and restores the operating system and active application programs to their previous context.

Although conventional techniques of power management enable a data processing system user to avoid the frustrating delay which accompanies rebooting the system and to reduce total power consumption as compared to operating the system at full power, conventional sleep modes have several major shortcomings. Computer users, and in particular portable computer users relying on battery power, risk the loss of data due to failure of the battery supplying power to the memory utilized to store the operating state of the data processing system. In addition, because conventional sleep modes are implemented to a great extent in hardware, sleep modes have heretofore only been available on data processing systems that are equipped with hardware which supports a low power mode of operation.

Consequently, it would be desirable to provide an improved method and system within a data processing system for saving the operating state of the data processing system to nonvolatile storage which does not require battery-supplied power. Furthermore, it would be desirable to provide an improved method and system for restoring the operating state of the data processing system from the nonvolatile storage.

SUMMARY OF THE INVENTION

It is therefore one object of the present invention to provide an improved data processing system.

It is another object of the present invention to provide an improved method and system within a data processing system for saving and restoring the operating state of the data processing system.

It is yet another object of the present invention to provide an improved method and system within a data processing system for storing the operating state of the data processing system to a nonvolatile mass storage device and thereafter restoring the operating state of the data processing system from the nonvolatile mass storage device.

The foregoing objects are achieved as is now described. A method and system are disclosed for efficiently storing an operating state of a data processing system having a volatile memory within a nonvolatile mass storage device. In response to a selected input, a determination is made whether storing the operating state of the data processing system is feasible. If storing the operating state is feasible, scheduling of tasks to be performed by the data processing system is halted. Data not required for operation of the data processing system is then removed from the volatile memory. The operating state of the data processing system is stored within the nonvolatile mass storage device, thereby enabling the operating state of the data processing system to be efficiently restored. Thereafter, power is removed from the data processing system. In response to restoring power to the data processing system, a determination is made whether the operating state of the data processing system is stored within the nonvolatile mass storage device. In response to a determination that the operating state of the data processing system is stored within the nonvolatile mass storage device, the operating state of the data processing system is loaded from the nonvolatile mass storage device, thereby restoring the operating state of the data processing system.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
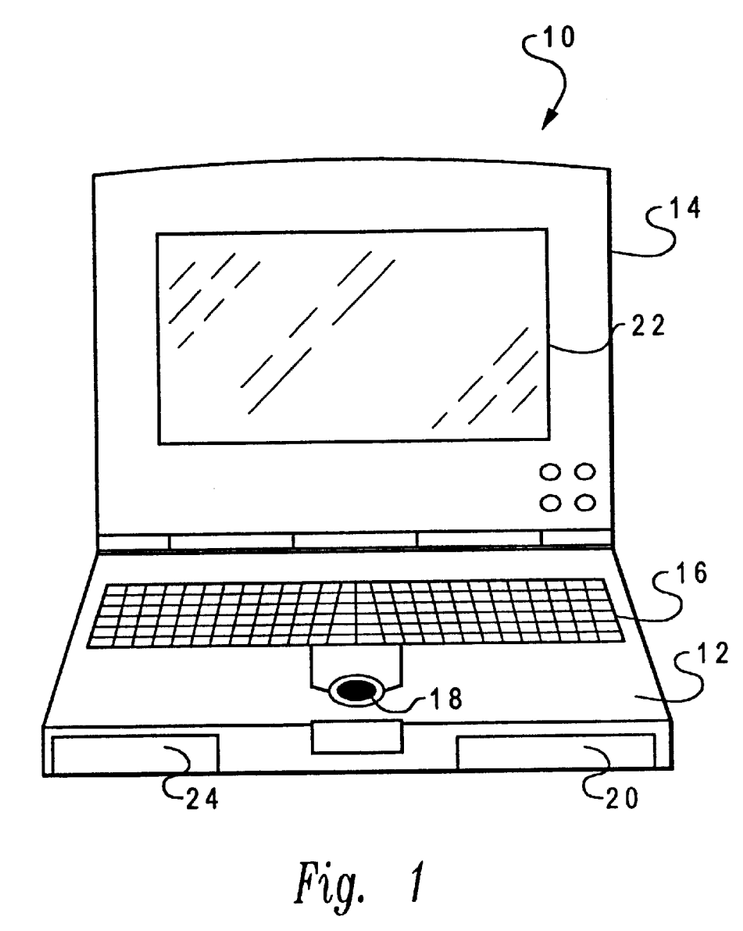
FIG. 1 illustrates a preferred embodiment of a data processing system which utilizes the method and system of the present invention.

With reference now to the figures, and in particular with reference to FIG. 1, there is illustrated a preferred embodiment of a data processing system utilizing the method and system of the present invention. As illustrated, data processing system 10, which in a preferred embodiment comprises one of the IBM ThinkPad portable computers, includes base 12 and cover 14 which is attached by a hinge along one edge to base 12 so that a user may open and close cover 14. As is well-known in the art, a user may input data to data processing system 10 utilizing keyboard 16, graphical pointing device 18, or other peripheral devices such as a floppy disk drive (not illustrated). Data processing system 10 outputs data to a user via display device 22, which is mounted inside cover 14. As is typical of portable computers, data processing system 10 can operate utilizing power supplied by rechargeable battery 24 or by a suitable DC transformer connected to a standard 120 V AC power supply.

Data processing system 10 also includes hard disk drive 20 which provides robust nonvolatile storage for programs and other data while data processing system 10 is powered off. As will be appreciated by those skilled in the art, the nonvolatile data storage provided by hard disk drive 20 can be augmented by attaching an optical disk drive, floppy disk drive, or other nonvolatile storage device to data processing system 10.

Figure 2:
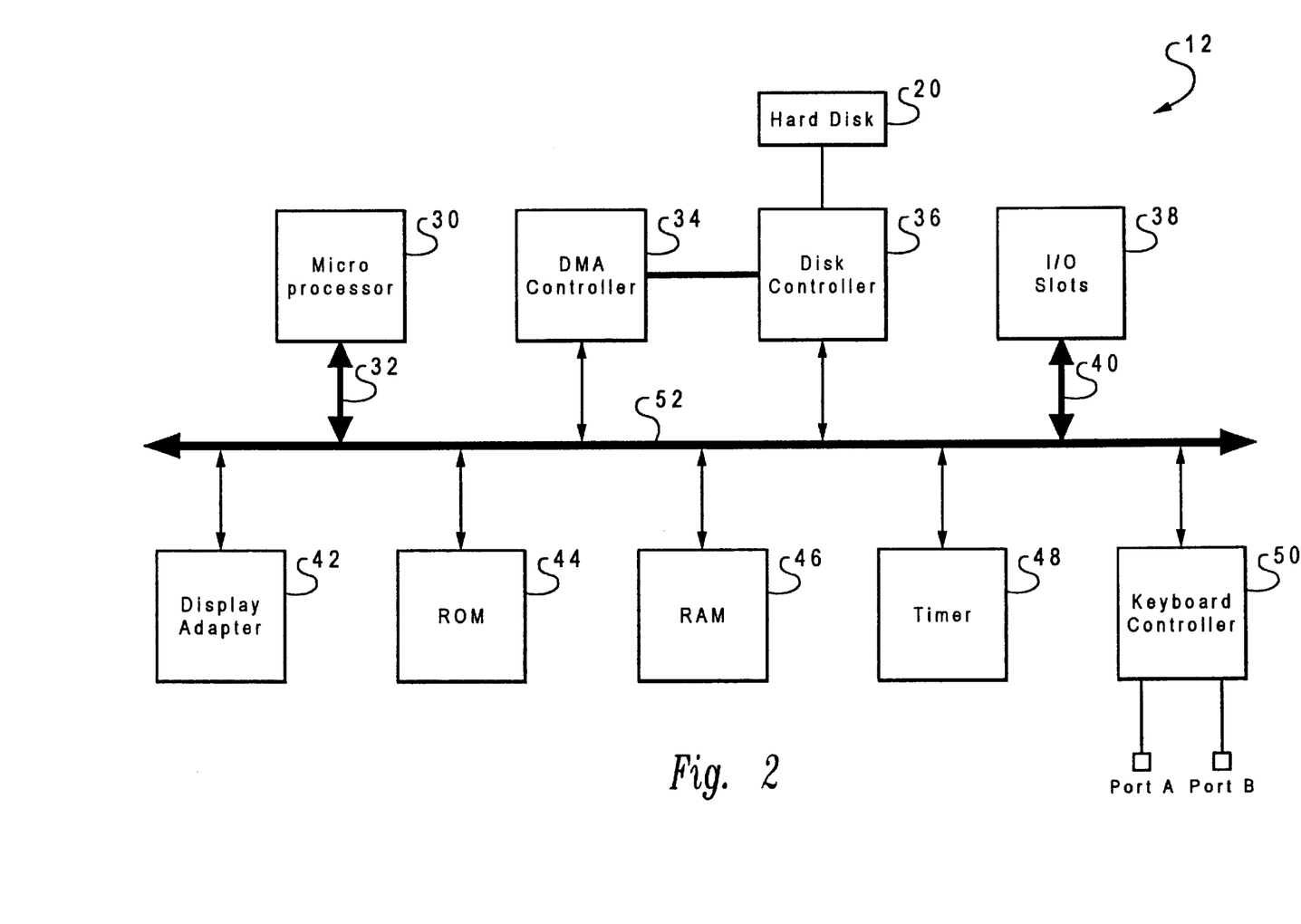
FIG. 2 depicts a block diagram of the components comprising the data processing system illustrated in FIG. 1.

Referring now to FIG. 2, there is depicted a block diagram of the principal components of data processing system 10 contained within body 12. As depicted, body 12 contains microprocessor 30, which is coupled to DMA controller 34, disk controller 36, display adapter 42, ROM 44, RAM 46, timer 48, and keyboard controller 50 via local bus 32 and system bus 52. Input/output (I/O) slots 38, which are coupled to system bus 52 via I/O bus 40, enable additional nonvolatile storage devices or memory to be coupled to data processing system 10.

DMA controller 34 manages data transfers between RAM 46 and disk controller 36, which is further coupled to hard disk drive 20. Display adapter 42 is coupled to display 22. Under the control of microprocessor 30, display adapter 42 transmits appropriate signals to display 22 in order to display the desired graphics images. In a preferred embodiment of the present invention, ROM 44 provides nonvolatile storage for software instructions utilized to control the fundamental operation of data processing system 10. As will be described in greater detail below, ROM 44 stores Power On/Self Test (POST) code, an operating system loader (boot strap program), and Basic Input/Output System (BIOS) software.

RAM 46 comprises a number of individual volatile memory modules which store segments of operating system and application software while power is supplied to data processing system 10. These software segments are partitioned into pages which each contain a uniform number of virtual memory addresses. As is understood by those skilled in the art, a virtual memory manager (not illustrated) coupled to RAM 46 manages the virtual memory address space accessible to software executed by microprocessor 30 and maps virtual memory addresses to physical addresses within RAM 46. When the execution of software requires more pages of virtual memory than can be stored within RAM 46, pages that are not currently needed are swapped with the required pages, which are held in secondary storage, such as hard disk drive 20.

Virtual memory pages are classified by the virtual memory manager as free, resident, or swappable. Free pages contain no useful data and are available for use. Resident pages, in contrast, must be retained within primary storage (i.e., RAM 46) because they contain data or instructions required for current processing. Swappable pages contain data that is not immediately required for current processing. The operating system of data processing system 10, which in a preferred embodiment of the present invention comprises OS/2 Warp, available from IBM Corporation, maintains a "swap" file within hard disk drive 20 to store swappable pages that are paged out of RAM 46. However, not all swappable pages that are paged from RAM 46 are stored in the swap file. If another copy of a swappable page exists, for example, in a file on hard disk drive 20, the virtual memory manager further classifies the swappable page as discardable. Thus, if a discardable swappable page is paged from RAM 46, the page is simply reclassified as free since a copy of the page already is available in secondary storage.

Finally, body 12 includes keyboard controller 50 and timer 48. Keyboard controller 50 is utilized to communicate with keyboard 16 and graphical pointing device 18 via port A and port B connectors, respectively. Timer 48 performs a number of timing functions within data processing system 10 and operates independently of the system clock (not illustrated) within data processing system 10. As will become apparent from the following description of the present invention, FIG. 2 depicts data processing system 10 in sufficient detail to illustrate the operation of the present invention; however, those skilled in the art will appreciate that a number of devices not required for an understanding of the present invention have been omitted for simplicity.

Each of microprocessor 30, DMA controller 34, disk controller 36, I/O slots 38, display adapter 42, RAM 46, timer 48, and keyboard controller 50 illustrated in FIG. 2 (i.e., not ROM 44 or hard disk drive 20), contains unique volatile information while data processing system 10 is operating. For example, during startup the operating system of data processing system 10 initializes keyboard controller 50 and other devices illustrated in FIG. 2 with configuration settings which allow the operating system to communicate with the devices. In addition, as described above RAM 46 stores a number of virtual memory pages containing operating system and application program data. The volatile information contained within devices within data processing system 10 defines an operating state of data processing system 10. According to the method of the present invention, the volatile information present within the components of data processing system 10 is stored to nonvolatile storage prior to powering off data processing system 10 to ensure that the operating state defined by the volatile information is not lost when data processing system 10 is powered off.

Figure 3:
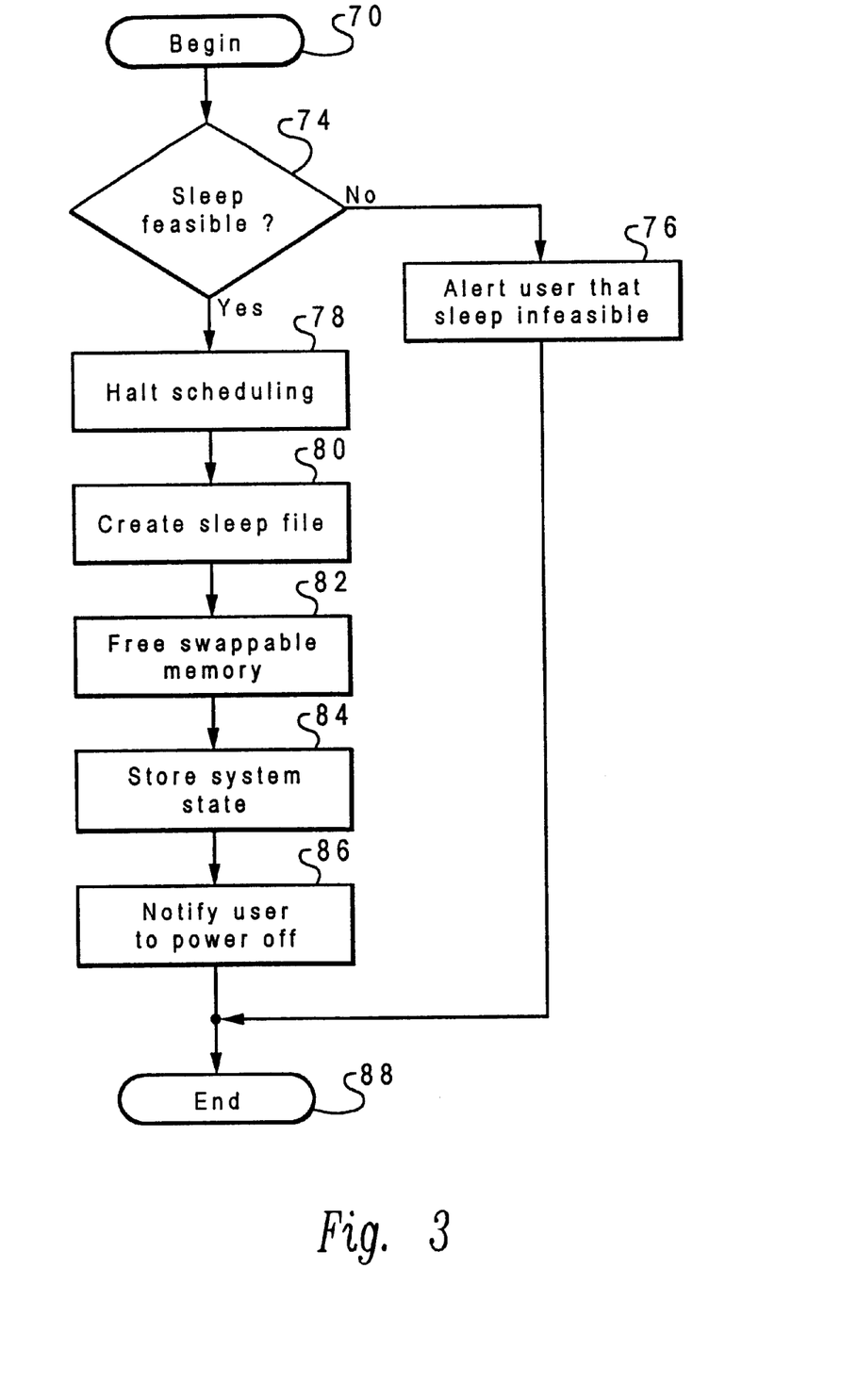
FIG. 3 is a flowchart illustrating the method utilized by the present invention to store the operating state of a data processing system.
Figure 4:
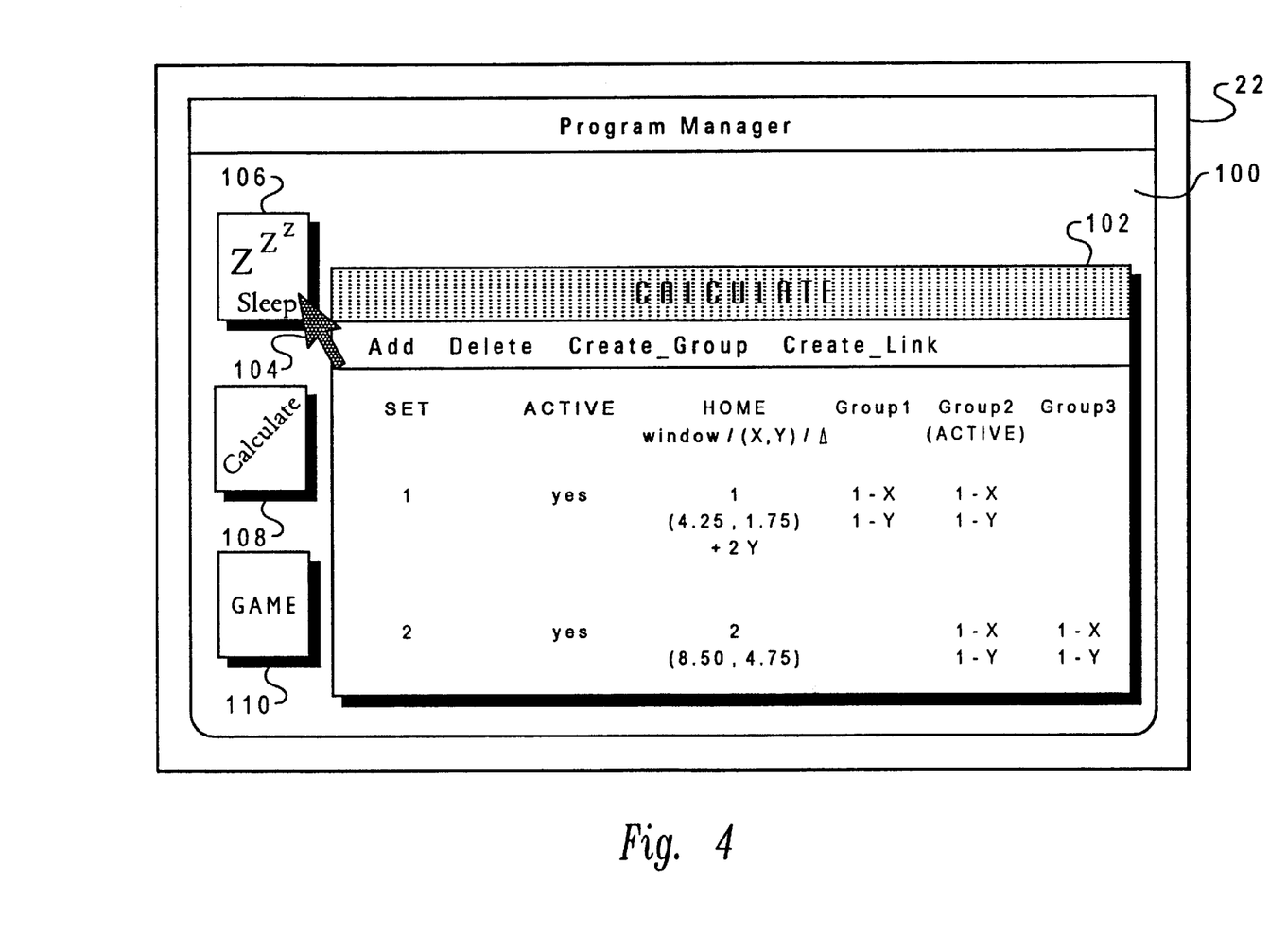
FIG. 4 depicts a preferred embodiment of a graphical user interface (GUI) that a user can manipulate to invoke a program which stores the operating state of a data processing system according to the method of the present invention.

With reference now to FIG. 3, there is illustrated a flowchart of the method employed by the present invention to store the operating state of a data processing system. As depicted, the process begins in block 70 in response to invocation of "sleep" mode, that is, initiation of the process of storing the operating state of data processing system 10. Referring now to FIG. 4, there is depicted a preferred embodiment of a graphical user interface (GUI) which may be manipulated by a user of data processing system 10 to initiate storing the operating state of data processing system 10. As illustrated, desktop 100, window 102, graphical pointer 104, and a number of user-selectable icons 106-110 are displayed within display device 22. As is well-known in the art, to invoke a routine, such as the application "CALCULATE" associated with icon 108, the user selects the icon representing the routine utilizing graphical pointer 104. Thus, according to a preferred embodiment of the present invention, the user invokes sleep mode by pointing to icon 106 with graphical pointer 104 while "double clicking" the button of graphical pointing device 18. In an alternate preferred embodiment of the present invention, data processing system 10 initiates sleep mode in response to a specified period of user inactivity elapsing. Thus, in this embodiment the process depicted in FIG. 3 initiates at block 70 if data processing system 10 is idle and the user has not input data to data processing system 10 for a predetermined time period.

Returning to FIG. 3, the process proceeds from block 70 to block 74, which depicts determining if entering sleep mode is possible given the current operating state of data processing system 10. For example, the operating system kernel determines that sleep is not possible if files stored on a floppy diskette are open, if communication adapters, such as network adapters and fax modems, are active, or if hard disk drive 20 contains inadequate space to store the operating state of data processing system 10. If the operating system kernel determines that entering sleep mode is inappropriate given the current operating state of data processing system 10, the process proceeds from block 74 to block 76, which illustrates notifying the user that entering sleep mode is inappropriate. For example, a warning box may be displayed within display 22 explaining what action the user needs to perform before entering sleep mode. Following block 76, the process terminates at block 88.

Returning to block 74, if the kernel determines that entering sleep mode is feasible, the process proceeds to block 78 which depicts the kernel halting scheduling of tasks by microprocessor 30. Halting task scheduling by microprocessor 30 grants the process depicted in FIG. 3 exclusive use of all system resources, thereby enabling a consistent operating state of data processing system 10 to be acquired. Execution of scheduled tasks interrupted by the present process is suspended until the operating state of data processing system 10 is restored.

Next, at block 80 a sleep file is created within hard disk 20. According to a preferred embodiment of the present invention, this sleep file, which will store the operating state of data processing system 10, utilizes space on hard disk drive 20 only while data processing system 10 is in the sleep mode. Thus, the presence of the sleep file is invisible to the user and does not consume hard disk storage space during operation of data processing system 10. In an alternate preferred embodiment of the present invention, at block 80 the process locates storage space on hard disk drive 20 in which to store the operating state, but does not create a sleep file. In this preferred embodiment, the operating state of data processing system 10 will be stored in the free sectors identified in block 80, but will not be identified as a file in order to facilitate storage of the operating state across partitions on hard disk drive 20.

Thereafter, the process proceeds to block 82, which illustrates freeing the swappable memory pages within RAM 46. At block 82, dirty memory pages (i.e., swappable memory pages that have been modified) are written to the operating system swap file on hard disk drive 20. According to the present invention, discardable swappable pages of memory (those that have not be modified) are simply discarded since a copy of the data is already stored elsewhere (e.g., on hard disk drive 20). Once the swappable memory pages have been freed, RAM 46 contains only resident memory pages, such as operating system data, which are required to operate data processing system 10. As will be appreciated by those skilled in the art, the advantage of storing swappable memory pages in the operating system swap file is that when operation of data processing system 10 is restored subsequent to powering on, the swappable memory pages will be demand paged back to RAM 46. Thus, memory pages which are required for operation of data processing system 10 are restored first, while other pages will be paged to RAM 46 as needed. Since only a portion of the swap file needs to be paged back to RAM 46 immediately after system restoration, the user quickly perceives that the operating state of the system is restored without waiting for the all virtual memory pages within the swap file to be loaded from hard disk drive 20 to RAM 46.

The process then proceeds from block 82 to block 84, which in a preferred embodiment of the present invention depicts storing the operating state of data processing system 10 within the sleep file on hard disk drive 20. In addition to saving the resident data stored within RAM 46, the contents of registers within microprocessor 30 and the configuration of each component of data processing system 10 that has a volatile hardware state is placed within the sleep file. Storing the configurations of the components of data processing system 10 enables the operating state to be restored without the operating system reinitializing each component following restart of data processing system 10. In the alternate preferred embodiment in which no sleep file was created at block 80, the process stores the operating state within the free sectors of hard disk drive 20 identified at block 80. As mentioned above, storing the operating state without utilizing a file structure enables the operating state data to be stored across disk partitions. The ability to store data across partitions is particularly important in data processing systems having a large amount of RAM or a nonvolatile storage device with several partitions. As a further enhancement of the present invention, the disk space required to store the operating state can be minimized by compressing the operating state data prior to storage utilizing one of a number of well-known data compression algorithms. Because accessing the operating state data on hard disk drive 20 is slow compared with internal operations of data processing system 10, storing compressed data also reduces the time required to restore the operating state following system restart.

Subsequently, the process proceeds from block 84 to block 86, which illustrates notifying the user that the operating state of data processing system 10 has been stored, indicating that the user can power off data processing system 10. In a preferred embodiment of the present invention in which the operating system of data processing system 10 supports a GUI, block 86 comprises displaying a window within display 22 containing the notification message. Thereafter, the process terminates at block 88.

Figure 5:
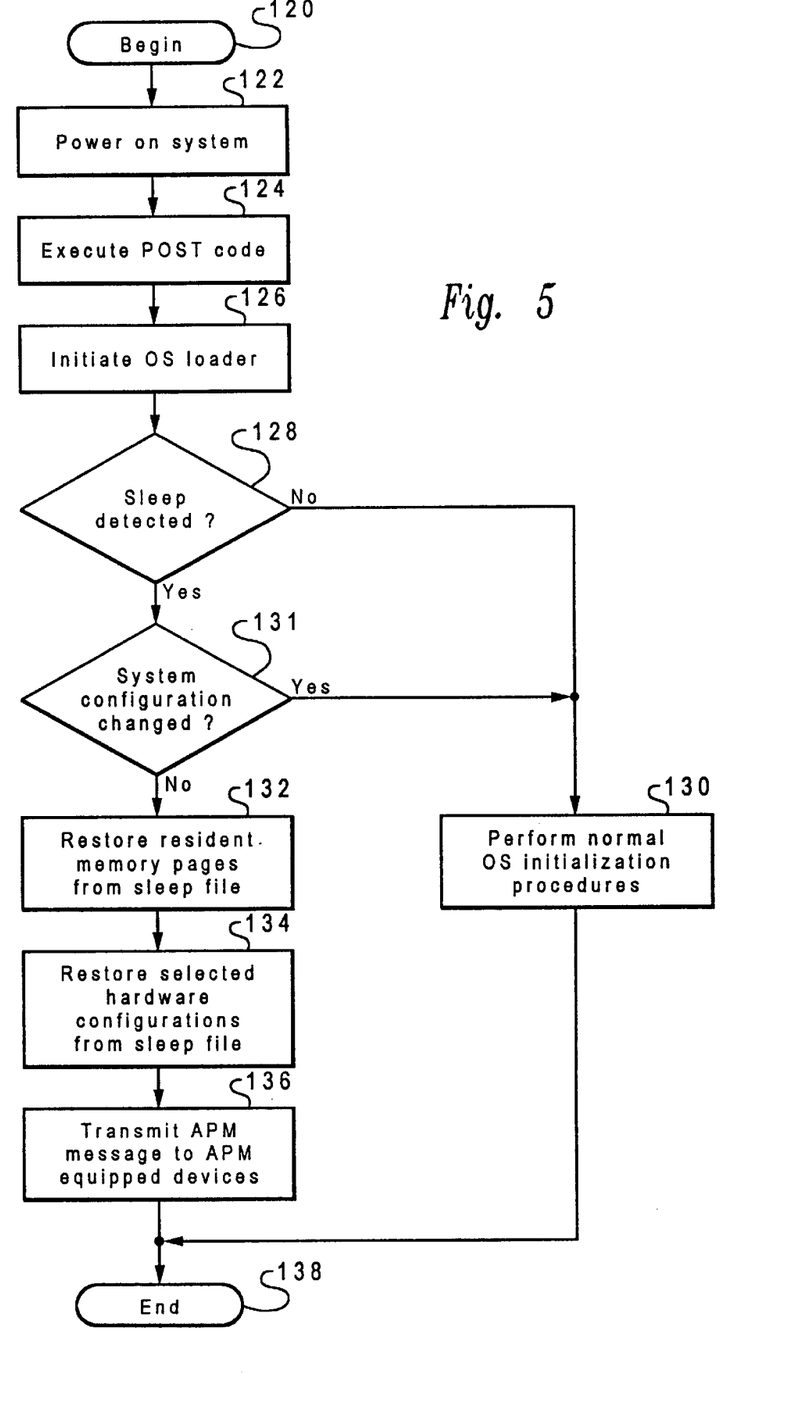
FIG. 5 is a flowchart illustrating the method utilized by the present invention to restore the operating state of a data processing system from nonvolatile storage.

With reference now to FIG. 5, there is illustrated a flowchart of the method utilized by the present invention to restore the operating state of data processing system 10. The process begins at block 120 and thereafter proceeds to block 122, which illustrates the user powering on data processing system 10. Upon start up, microprocessor 30 begins execution of POST code stored within ROM 44 at block 124. The process then proceeds to block 126, which illustrates an operating system loader executing to load the operating system of data system 10.

Next, the process proceeds to block 128, which depicts a hook inserted into the operating system loader determining if a sleep file (or operating state data) is stored on hard disk drive 20. If the software hook does not detect a sleep file, the process proceeds to block 130, which illustrates loading the operating system from the designated boot device (e.g., hard disk drive 20) and initializing the devices depicted in FIG. 2 according to the conventional startup routine followed by the operating system.

If, however, the software hook detects a sleep file on hard disk drive 20, the process proceeds to block 131, which illustrates determining from the data returned by POST if the configuration of data processing system 10 has changed since the system state was stored. If devices have added to or removed from data processing system 10, the process proceeds to block 130, which has been described. Verifying that the configuration of data processing system 10 remains unchanged ensures that operating system settings for each device within data processing system 10 may be correctly restored. If the devices within data processing system 10 at restart are consistent with the devices present when the operating state was saved, the process proceeds to blocks 132–136, which illustrate restoring the operating state of data processing system 10 from the sleep file on hard disk drive 20. First, at block 132 virtual memory pages that are classified as resident are restored to RAM 46. Additional pages of nonresident data may also be paged from the swap file if the performance of hard disk drive 20 is sufficient to avoid an unacceptable user-perceived delay in restoring the operating state. Next, the hardware configurations of other components of data processing system 10 are restored at blocks 134 and 136. Blocks 134 and 136 illustrate the restoration of hardware configurations in a preferred embodiment of the present invention in which at least some of the components of data processing system 10 meet the Advanced Power Management (APM) specifications. At block 134, the hardware configurations of devices that do not support APM are restored from the sleep file. Since devices which support APM can recall their prior operating system settings, at block 136 the hardware configurations of APM-equipped devices are restored by transmitting an APM message from microprocessor 30 to these devices. Upon the restoration of the operating state of data processing system 10, the user will perceive that data processing system 10 is in the same state that it was in prior to invoking sleep state. For example, returning to FIG. 4, display 22 will again display window 102, graphical pointer 104, and icons 106–110. Thereafter, the process depicted in FIG. 5 terminates at block 130.

As has been described, the present invention provides a method and system for efficiently storing the operating state of a data processing system to nonvolatile mass storage. The present invention enables the operating state of a data processing system to be saved and restored without the risk of loss of the operating state due to a power failure. Utilizing the present invention, a user can return to a particular operating system and application program context after system restart significantly faster than by employing conventional booting. In addition, the method of the present invention is transportable between a wide variety of data processing systems, since the present invention is not hardware-dependent and can be implemented within operating system software.

While the invention has been particularly shown and described with reference to a preferred embodiment, it will be understood by those skilled in the art that various changes in form and detail may be made therein without departing from the spirit and scope of the invention. For example, although the present invention has been described with reference to a preferred embodiment which stores the operating state to a hard disk drive, those skilled in the art will recognize that other nonvolatile mass storage devices, such as magnetic tape, floppy disk, optical disk, or the like, may be utilized. In addition, those skilled in the art will appreciate that although the present invention has been described with reference to a portable computer, the present invention is equally applicable to desktop personal computers and other data processing systems.

What is claimed is:

1. A method for efficiently storing an operating state of a data processing system within a nonvolatile mass storage device, said data processing system having a processor and a volatile system memory, wherein said data processing system addresses a virtual memory address space divided into a plurality of memory pages, and wherein a subset of said plurality of memory pages is stored within said volatile system memory, and wherein volatile data within said data processing system defines said operating state, said method comprising:

in response to a selected input, determining if storage of said operating state of said data processing system is possible;

in response to a determination that storage of said operating state is possible, halting scheduling of tasks to be performed by said data processing system;

removing data not required for operation of said data processing system from said volatile system memory, said step of removing data not required for operation of said data processing system from said volatile memory including:

discarding each memory page within said subset of said plurality of memory pages for which a copy is stored within said nonvolatile mass storage device or which contains no data;

thereafter, storing within said nonvolatile mass storage device each memory page within said subset of said plurality of memory pages that contains data not required for operation of said data processing system; and thereafter, storing said operating state of said data processing system within said nonvolatile mass storage device, wherein said operating state of said data processing system can be efficiently restored.

2. The method for efficiently storing an operating state of a data processing system within a nonvolatile mass storage device of claim 1, wherein said data not required for operation of said data processing system is stored within a swap file maintained by an operating system of said data processing system to temporarily store memory pages among said plurality of memory pages.

3. A system for efficiently storing an operating state of a data processing system within a nonvolatile mass storage device, said data processing system having a processor and a volatile system memory, wherein said data processing system addresses a virtual memory address space divided into a plurality of memory pages, and wherein a subset of said plurality of memory pages is stored within said volatile system memory, and wherein volatile data within said data processing system defines said operating state, said system comprising:

means for determining if storage of said operating state of said data processing system is possible in response to a selected input;

means, responsive to a determination that storage of said operating state is possible, for halting scheduling of tasks to be performed by said data processing system;

means for removing data not required for operation of said data processing system from said volatile system memory said means for removing data not required for operation of said data processing system from said volatile memory including:

means for discarding each memory page within said subset of said plurality of memory pages for which a copy is stored within said nonvolatile mass storage device or which contains no data;

means for thereafter storing within said nonvolatile mass storage device each memory page within said subset of said plurality of memory pages that contains data not required for operation of said data processing system; and     means for thereafter storing said operating state of said data processing system within nonvolatile mass storage device, wherein said operating state of said data processing system can be efficiently restored.

4. The system for efficiently storing an operating state of a data processing system within a nonvolatile mass storage device of claim 3, wherein said means for storing stores data not required for operation of said data processing system within a swap file maintained by an operating system of said data processing system to temporarily store memory pages among said plurality of memory pages.

* * * * *